(12) United States Patent
Paul

(10) Patent No.: US 6,356,838 B1
(45) Date of Patent: Mar. 12, 2002

(54) SYSTEM AND METHOD FOR DETERMINING AN EFFICIENT TRANSPORTATION ROUTE

(75) Inventor: Sunil Paul, 1506 Willard, San Francisco, CA (US) 94117

(73) Assignee: Sunil Paul, San Franscisco, CA (US)

(*) Notice: Subject to any disclaimer, the term of this patent is extended or adjusted under 35 U.S.C. 154(b) by 0 days.

(21) Appl. No.: 09/625,069

(22) Filed: Jul. 25, 2000

(51) Int. Cl.[7] .......................................... G06F 165/00
(52) U.S. Cl. ........................ 701/209; 701/201; 701/213
(58) Field of Search ................................. 701/209, 213, 701/26, 25, 201; 73/178 R

(56) References Cited

U.S. PATENT DOCUMENTS

| | | | | |
|---|---|---|---|---|
| 5,229,941 A | * | 7/1993 | Hattori .................... | 364/424.02 |
| 5,845,227 A | * | 12/1998 | Peterson ...................... | 701/209 |
| 5,845,228 A | * | 12/1998 | Uekawa et al. ............. | 701/209 |
| 5,878,368 A | * | 3/1999 | DeGraaf ..................... | 701/209 |
| 5,893,898 A | * | 4/1999 | Tanimoto .................... | 701/201 |
| 5,902,349 A | * | 5/1999 | Endo et al. ................. | 701/202 |
| 5,916,299 A | * | 6/1999 | Poppen ....................... | 701/202 |
| 5,926,118 A | * | 7/1999 | Hayashida et al. .......... | 340/995 |
| 5,933,100 A | * | 8/1999 | Golding ...................... | 340/995 |
| 5,956,250 A | * | 9/1999 | Gudat et al. .......... | 364/424.031 |
| 5,978,733 A | * | 11/1999 | Deshimaru et al. ......... | 701/209 |
| 5,991,688 A | * | 11/1999 | Fukushima et al. ......... | 701/209 |
| 6,002,981 A | * | 12/1999 | Kreft .......................... | 701/210 |
| 6,023,653 A | * | 2/2000 | Ichimura et al. ............ | 701/208 |
| 6,035,253 A | * | 3/2000 | Hayashi et al. ............. | 701/211 |
| 6,107,944 A | * | 8/2000 | Behr et al. .................. | 340/995 |
| 6,109,396 A | * | 8/2000 | Sirg et al. ................... | 187/381 |
| 6,175,800 B1 | * | 1/2001 | Mori et al. ................. | 701/202 |
| 6,208,934 B1 | * | 3/2001 | Bechtolshim et al. ....... | 701/209 |

OTHER PUBLICATIONS

"Making Smart Shuttles Smart In Los Angeles", McLaughlin, et al., pp. 59–63.
Bus and Paratransit Conference Proceedings, Houston, Texas, May 7–11, 2000.
"Paratransit In America, Redefining Mass Transportation", Robert Cervero, pp. 235–256, 1997.

* cited by examiner

Primary Examiner—William A. Cuchlinski, Jr.
Assistant Examiner—Olga Hernandez
(74) Attorney, Agent, or Firm—Blakely, Sokoloff, Taylor & Zafman

(57) ABSTRACT

A computer-implemented method is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments.

Also described is a computer-implemented method for providing transportation services comprising: receiving a transportation request from a passenger; tracking the passenger's position following the request using positional detection logic; and transmitting positional data identifying the passenger's position to a pickup vehicle.

27 Claims, 2 Drawing Sheets

SYSTEM AND METHOD FOR DETERMINING AN EFFICIENT TRANSPORTATION ROUTE

BACKGROUND OF THE INVENTION

1. Field of the Invention

This invention relates generally to the field of transportation services. More particularly, the invention relates to an improved system and method for providing transportation services over a data communications network.

2. Description of the Related Art

The automobile is one of the most successful inventions of all time but automobiles and the industry surrounding them are also responsible for more pollution and toxic waste than any other product of the industrial era. Unfortunately, the typical use of automobiles—in particular personal automobiles—is extremely inefficient. On a typical day, one can see large numbers of personal automobiles parked and not in use. This represents a large base of underutilized capital goods. At the same time, the use of alternative modes of transportation that are more efficient—public transportation, taxis, private cars—is either inconvenient or too expensive.

Private automobiles are both ubiquitous (at least in industrialized countries) and inefficiently utilized, in part because the modern consumer wants the "on demand" transportation services a waiting car represents. In a typical rush hour commute virtually every car is driven by a sole driver. A more convenient and efficient utilization of automobiles and other forms of on-demand transportation could replace a large number of automobiles and therefore be a boon to consumers, the environment, and congestion on our highways. If applied to other on-demand resource situations, it could also be used to enhance the efficiency of industry and commerce.

SUMMARY

A computer-implemented method is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments.

Also described is a computer-implemented method for providing transportation services comprising: receiving a transportation request from a passenger; tracking the passenger's position following the request using positional detection logic; and transmitting positional data identifying the passenger's position to a pickup vehicle.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of embodiments of the invention. It will be apparent, however, to one skilled in the art that these embodiments may be practiced without some of these specific details. In other instances, well-known structures and devices are shown in block diagram form to avoid obscuring the underlying principles of these embodiments.

Embodiments of the invention described below provide for an automated method for convenient, efficient allocation of personal transportation and other on-demand transportation resources. These embodiments may also be extended for use in a variety of scenarios in which a mobile resource requires scheduling and allocation of that resource.

An Exemplary Network Architecture

Figure 1:
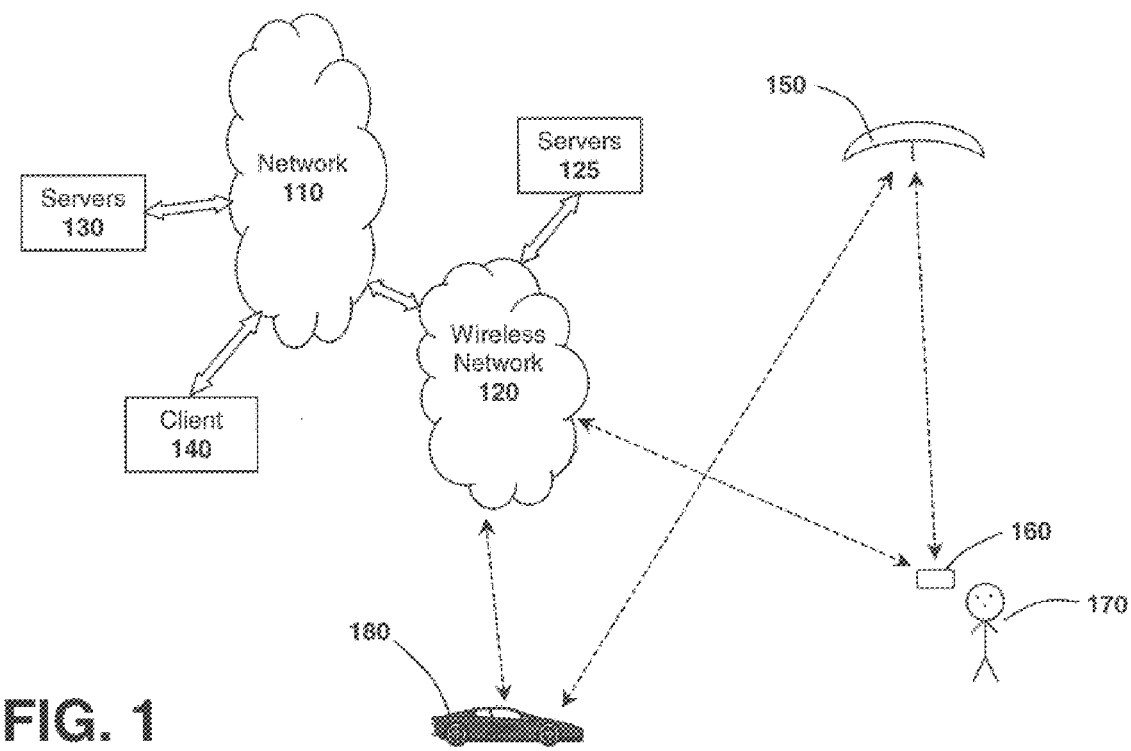
FIG. 1 illustrates an exemplary network architecture for implementing various embodiments of the invention.

Embodiments of the invention may be implemented within a networking architecture such as that illustrated in FIG. 1. The particular embodiment shown in FIG. 1 includes a wireless communication network 120 for supporting communication between two or more wireless devices (e.g., device 160). The wireless communication network 120 may also include a communication link to a larger network 110 such as the Internet over which a plurality of servers 130 and clients 140 communicate.

In one embodiment, a personal wireless device 160 operated by a user 170 transmits and receives data as well as audio signals. For example, in one embodiment, the wireless device 160 (and/or the wireless network 120) is configured to transmit and receive data using the Wireless Application Protocol ("WAP"). The WAP is a communications standard which specifies an application framework and associated network protocols for wireless devices such as mobile telephones, two-way pagers and personal digital assistants ("PDAs"), and which leverages existing mobile networking technologies (e.g., digital data networking standards) and existing Internet technologies (such as Extensible Markup Language, URLs, scripting, and various content formats).

Regardless of the type of wireless data transmission standard employed, the wireless device 160 of one embodiment is capable of communicating with servers 130 and/or clients 140 over the network 120 and/or directly over the wireless network 120 (e.g., with servers 125). In one embodiment, one or more transportation vehicles 180 are also equipped with wireless devices (not shown) capable of transmitting and receiving various types of data over the wireless network 120.

In one embodiment, the vehicle 180 may also be configured with a personal information device such as a computer and optional interface components such as display, audio components, a keyboard, a touch-screen, a joystick, . . . etc, to be used by a passenger during transport. In addition, the system may include AM/FM radio reception, TV reception and display, and/or Internet access via the wireless network 120.

In one embodiment, the personal wireless device 160 of the user 170 and/or the driver contains a location-identification capability. For example, the wireless device 160 may include Global Positioning System ("GPS") logic or cell-based locator logic (e.g., such as the positioning technology developed by Snap-Trac™, Inc). In an embodiment which uses a form of GPS technology, the wireless device 160 may transmit and receive positional data to/from one or more global positioning satellites 150.

In one embodiment, one or more data centers equipped with servers 130 and/or 125 for providing the transportation services described herein (hereinafter "transportation services") are operated and maintained on a regional basis, based on the demands of the marketplace and/or the geographical scope of the service. These services, described in detail below, may include a customer billing system, a customer profiling system used for advertising, merchandising, and/or content delivery to transportation system passengers 170.

Embodiments of System Operation

Figure 2:
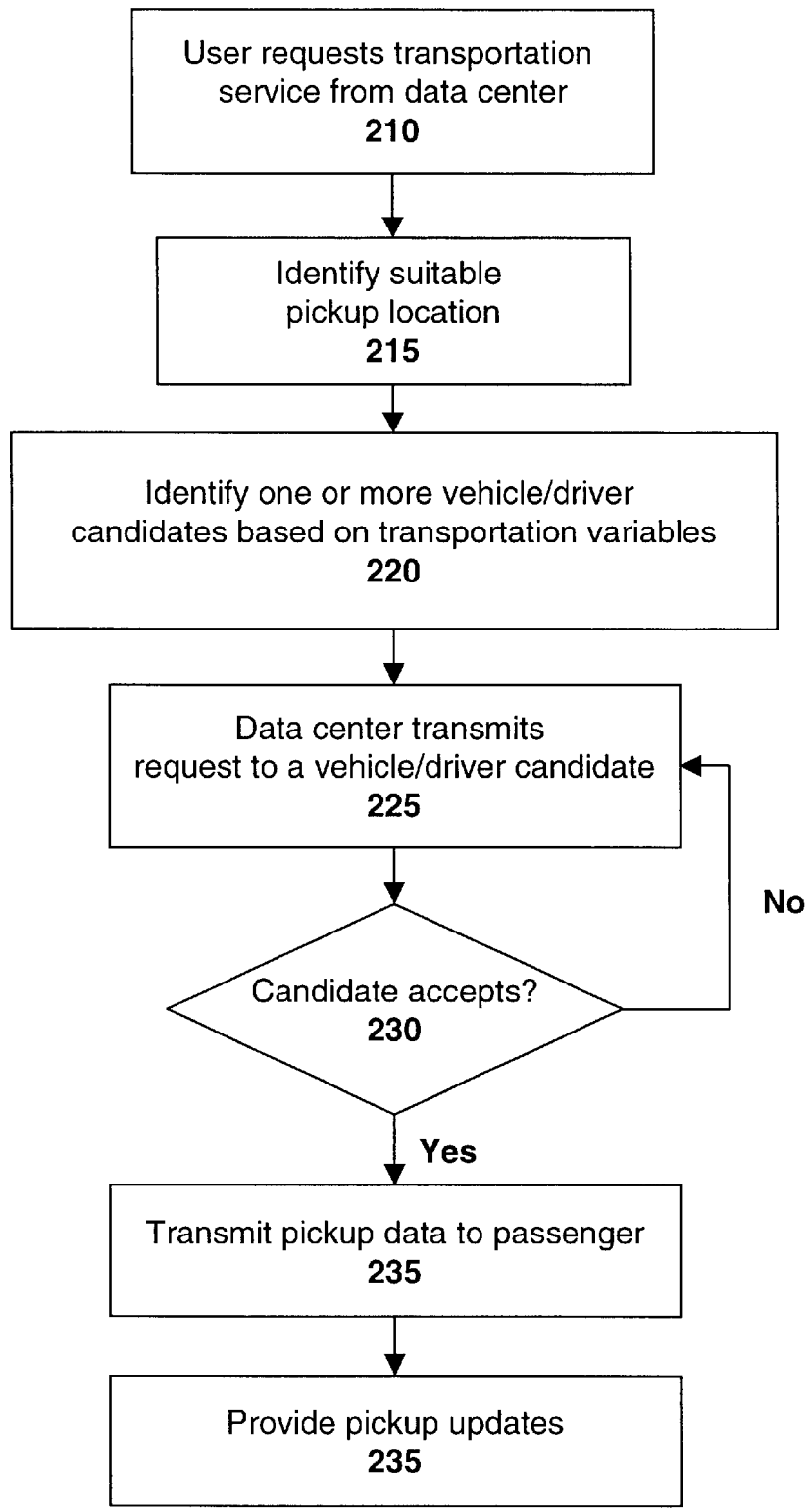
FIG. 2 is a flowchart of a method according to one embodiment of the invention.

System operation according to one embodiment of the invention will now be described with respect to the flowchart illustrated in FIG. 2 as well as the network architecture of FIG. 1. This embodiment employs the wireless network 120 and/or the Internet 110 to coordinate the on-demand or scheduled pickup and drop-off of passengers 170. It should be noted that various wireless and terrestrial communications technologies may be employed while still complying with the underlying principles of the invention. For example, the vehicle 180 may be equipped with a device for communicating using the Global System for Mobile Communications ("GSM") protocol, the General Packet Radio Service ("GPRS") protocol, and/or any other communication protocol/standard capable of communicating data, audio and/or video. In one embodiment, described in detail below, the vehicle 180 is equipped with a television receiver and/or an AM/FM receiver.

At 210, a user 170 of the service indicates her need for transportation from point A to point B by transmitting a transportation request from the wireless device 160 and/or from a client computer 140 connected to the network 110 (if one is available). Accordingly, she may connect to a data center server (e.g., to server 130) over the wireless network 120 and/or the Internet 110.

In one embodiment, the passenger's 170's location is automatically known by a GPS tracking device (not shown) embedded in the wireless communication device 160. Based on the GPS tracking information, at 215, a lookup performed on a data center server 130 (and/or 125) determines one or more suitable pickup locations for the passenger.

In one embodiment, the potential passenger 170 is provided with a number of options for pickup based on larger-area data such as, for example, zip code, area code, and/or the potential passenger's cellular zone. Alternatively, or in addition, the potential passenger 170 may be prompted by servers (e.g., 130, 125) at the data center to enter a destination address, a time-frame within which she needs/wants to have the transportation available (e.g., immediately at the airport, tomorrow at 2:00 PM), and/or any other relevant information (e.g., number of passengers who need to be transported, class of service, type of vehicle, minimum safety record and reliability of the driver, . . . etc).

The data center may then provide the potential passenger 170 with a price at which the requested transportation service will be rendered, based on the vehicles available and the price at which the drivers of those vehicles are willing to provide service. Under this embodiment, different drivers (or other entities in control of pricing and/or resource allocation such as other transportation companies)may choose to provide transportation services using different pricing schedules (e.g., $0.90/mile, $20 per trip within 10 miles, . . . etc). Alternatively, each driver who signs up with the transportation service may be required to agree to a standard pricing schedule. Alternatively, a driver's rate may be based on that driver's experience, timeliness record, safety record, or other driver-specific variables.

In one embodiment, the potential passenger 170 may quote a price which she is willing to pay for the transportation and the data center may match that price with an appropriate driver/vehicle 180 if one is available (i.e., with a driver in the area willing to accept the quoted price). In this embodiment, the data center may auction drivers to the highest bidding passengers. Similarly, passengers may be required to enter prices that represent minimum or maximum acceptable prices for the transportation. In one embodiment, one of the many auction mechanisms known in the art are used to match passengers to drivers or other transportation resources.

Regardless of how a price is selected, at 220 the data center identifies one or more vehicles 170 to comply with the transportation request based on the specifics of the request. The determination as to which vehicle is a most "appropriate" match for the passenger may be based on a number of different factors including, for example, the location of the user, the quoted price, the number of passengers, the class of service or type of vehicle requested (e.g., private or shared car, extra cargo space), whether a destination is provided (e.g., roundtrip journeys may be better for resource allocation), the length of time the driver has been driving or other safety/regulation-related factors, and/or the timeliness of the driver.

In addition, in one embodiment, the data centers may factor in the current traffic conditions to make a driver selection (or, for that matter, a pickup point selection). Thus, a driver who is relatively further away from the pickup point may be selected if he has a quicker path to the passenger based on traffic conditions. Any of the foregoing factors, alone or in combination, may be used to render a driver/vehicle selection. If an acceptable vehicle cannot be identified, the passenger may be offered an opportunity to choose from a list of next-best alternatives (e.g., different class of vehicle, different arrive time, local rental car or bus service).

In addition, a prioritized list of driver candidates may be compiled at the data center. In one embodiment, the location of each vehicle 180 is known because of positional information gathered automatically from the vehicle's 180's wireless device. Alternatively, or in addition, the driver of the vehicle 180 may manually transmit positional information to the data center on a periodic basis.

At 225, once an appropriate vehicle has been identified, the data center sends a pickup request to the driver of that vehicle 180 indicating that a potential passenger 170 is available and/or additional information related to that passenger 170 (e.g., the number of passengers, the time period within which the passengers require service, the location of the passengers, . . . etc). In an embodiment which generates a prioritized list of driver candidates, the initial driver candidate may be selected from the top of the list.

In one embodiment, if the driver accepts the pickup, the driver then confirms an estimated arrival time (e.g., within the time period specified by the passenger 170). If the driver accepts, a confirmation code associated with the transportation transaction may be generated. In one embodiment this may simply be the user's 170's telephone number. Alternatively, the driver may indicate that she is unable or unwilling to make the pickup (determined at 230), in which case another suitable vehicle/driver is identified from the prioritized list of vehicle/driver candidates (in an embodiment which employs a prioritized list). In one embodiment, the passenger 170 is notified by the data center of the progress of her request.

Once a driver has accepted, at 235 a message is transmitted to the user/passenger 170 confirming pickup location, time, a quoted price and/or the confirmation code for the driver. In one embodiment, the passenger 170 is then asked to confirm that these parameters are acceptable. If so, then the driver is notified of the confirmation. At this stage, the passenger's cell phone (or other wireless device) number may be transmitted to the driver and/or the driver's cell phone number may be transmitted to the passenger 170, so that the two can communicate directly over the wireless network 120.

In one embodiment, the passenger's and driver's cell phone numbers (and any other potentially confidential data) are kept only at the data center and communications coordinated through the data center. In one embodiment, the driver and passenger are each given a unique identifier separate from their cell phone number or other wireless access device.

The driver then proceeds to the pickup point. As the driver continues on her way, she may update the passenger 170 of any changes to the arrival time estimate including, for example, the fact that she has arrived at the pickup point. These updates can be in the form of either a "pull" transmission (e.g., wherein the passenger's wireless device 160 periodically polls the server 125 or 130 for a pickup update) or a "push" transmission (e.g., wherein the server 125 or 130 automatically transmits an update to the wireless device; or, alternatively, wherein a confirmation telephone call is placed to the passenger).

Alternatively, or in addition, the updates may be comprised of a combination of both pull and push communications technology (e.g. pull up to a fixed time before arrival then a push notification). In one particular embodiment, the pull mechanism is a periodic reference to an updated WAP page or Web page by the wireless device 160, and the push mechanism is a Short Message Service ("SMS") message or pager notification transmitted by the server 125,130 for wireless environments and/or an email or instant message for wired modes.

In one embodiment, the data centers may utilize live operators to dispatch and update users on the progress of a particular transaction (e.g., how close the driver is) in addition to the computer-implemented updates described above. Alternatively, or in addition, an interactive voice response ("IVR") system may be programmed to provide user updates (e.g., such as those employed by Tellme™ Networks and others).

While the passenger 170 waits for the transportation, she can notify the data center and/or the driver that she has decided to cancel the trip, change the pickup time, pickup location, and/or any other changes to her itinerary.

When the driver arrives, the driver and passenger 170 may exchange confirmation codes to verify that they are matched correctly. In one embodiment, this exchange may occur via a communication through the wireless network 120. Alternatively, or in addition, the code exchange may occur directly between devices (e.g., through a short-range communications medium like an infrared communication link or a Bluetooth protocol link).

As mentioned above, in one embodiment, passenger and/or driver billing information is maintained at the data center. Accordingly, when driver arrives at the destination, a new billing record may be generated in the billing database. The bill may be directly applied to the passenger's credit card, or, alternatively, may be mailed to the passenger. Similarly, the driver's account may be credited by the amount of the bill or some percentage of the amount.

In one embodiment, the user may use a computer such as client 140 connected to the Internet 110 to schedule or request transportation (i.e., rather than a wireless device). In this embodiment, pickup locations may be entered directly by the user and/or stored in a cookie on the user's hard drive. This embodiment could be in the form of a dedicated kiosk or a general-purpose computer anywhere on the network 110. In this embodiment, a cookie may correspond to multiple locations to allow for multiple resources (e.g., such as a laptop computer). In one embodiment, users may schedule pickups for future dates/times from the client 140 as well as the wireless device 160. In this embodiment, the billing system may be programmed to provide discounted transportation fees for transportation scheduled far enough in advance.

Pickup points may be determined using a variety of techniques including, but not limited to, identifying the nearest addressable building or the nearest street crossing; pre-selecting a number of pickup points in a given area; using pickup points frequently chosen by other similar passengers based on collaborative or other matching technology; and/or using pickup points designated by others other entities such as a driver, an airport authority, a city bus authority, . . . etc.

In one embodiment, pickup point data is stored and analyzed at the data center depending on the hardware and software sophistication on the user's wireless device 160. Alternatively, or in addition, all or some of the pickup point database may be cached locally on wireless devices 160 to improve response time (i.e., if the wireless device 160 is capable of caching data). One embodiment of a lower-cost wireless device includes a manual input for new pickup points and a historical record of past/recent pickup points, thereby reducing the need for repetitive data entry. One embodiment of a more fully featured wireless device would also cache data such as driver profiles, advertising, and other information.

In one embodiment of the invention, in addition to the foregoing features, a passenger may dial a phone number and arrange for a pickup using either a human-answered or automated data entry system. This alternative can be combined with some of the other automated features above to maximize the flexibility of the transportation system.

In one embodiment of the invention, a map of the region surrounding the pickup point may be displayed on the user's wireless device 160 or computer 140 to simplify the process of selecting a pickup point. The user may select a particular point on the map and this data may be transmitted to the data center for processing. Moreover, once a point has been identified at the data center (e.g., based on driver availability), the data center may transmit a map to the user with an indication of the pickup point.

Using confirmation codes (as briefly described above) will help to promote integrity and trust of the overall transportation system. Passengers who use the system will feel secure that they are being provided with a driver whose activity is monitored and who will, therefore, be held accountable. Similarly, drivers will be servicing customers who are known to the data center. In one embodiment, a reliability measurement is generated for drivers and/or passengers based on driver/passenger data maintained at the data center (e.g., passenger 'xyz' is on average 5 minutes late to meet the vehicle) and/or based on feedback from the drivers and passengers (e.g., passengers may rate the friendliness or cleanliness of the driver or vehicle). Various other reliability and/or quality measurements may be factored into the data center analysis while still complying with the underlying principles of the invention.

In one embodiment, entertainment and/or workspace services are uniquely tailored to the preferences of the passenger in the vehicle (e.g., through the personal information device). For example, a personal stereo in the vehicle may be automatically set to a passenger's preferred radio stations and/or work documents may be made available via a connection to a shared document service on the Internet 110 (e.g., through the wireless network 120). A passenger code (or other mechanism for tracking the passenger's preferences) may be used to identify the passenger's preferences from a passenger profile database maintained at the data center. Alternatively, or in addition, the wireless device 160 may be bundled with a long-term memory device (e.g. a hard disk) to store relevant personalization data, personal documents and/or files. In one embodiment the passenger code may be the same as the confirmation code described above.

In one embodiment, the computer or other personal information system may receive the passenger/confirmation code through one of several optional mechanisms. For example, the passenger or driver may enter it directly; it may be automatically transmitted through an interconnection with the central dispatch system (e.g., over the wireless network 120); and/or it may automatically be provided via a direct wireless connection with the passenger's 170's personal wireless device 160 (e.g. via a Bluetooth protocol link).

Moreover, the personalized resources may be provided in either a Internet-disconnected or Internet-connected mode. In the disconnected mode, the resources are selected among those available on the local storage device. For example, a passenger 170 may have a preference for particular radio stations which are pre-selected as options. In addition, through a linkage with the location information and mapping data, periodic updates on the progress of the journey may be presented to the passenger. In a connected mode, certain Internet resources (e.g., the passenger's personal homepage) may be made available. In addition, the connected mode may include the ability for the passenger's personal data to be pre-cached on a local hard disk in the vehicle 180 as the vehicle 180 is in-transit to the pickup point.

In one embodiment, an optional service tied to the customer code or other personal identifier would provide targeted advertising based on the preferences and other information (e.g., demographic information) available about a passenger. Because many personal information displays are customized to the tastes of a particular customer, it is possible to target advertising to these passengers based on their profiles, customer data, trip origin, trip destination, and/or point in the progress of the trip. For example, on the way to the destination, advertisements for local restaurants or other stores may be transmitted to the passenger's 170's wireless device 160. Moreover, the advertisements may also be linked with a loyalty program or a special drop-off discount. In one embodiment, the advertising may be displayed on the in vehicle personal information device.

In one embodiment, the various transportation features described herein may be linked to a billing system that provides for a variety of different business models. In addition to those discussed above, these include, for example, a flat subscription price that allows for unlimited use of the system; limited use based on time in the transport, distance traveled, boundaries crossed (e.g. within a city limit); billing on a per-trip basis with a calculation made for each proposed trip; whether a destination address is provided; discounts/surcharge for various groups or affiliates, scheduling travel in advance, length of stay over, etc.; discounts/surcharge for particular destinations such as the billing address of the passenger 170, or an airport or restaurant; whether a round-trip is requested; discounts for accumulating adequate frequent traveler or other loyalty-program points; billing groups to a corporate account or other group account; payments from certain business destinations that pay for passengers to be let off at particular locations (e.g. a shopping mall, a restaurant or other retail outlet); pre-paid billing similar in principle to a pre-paid telephone card (this allows people without credit histories to use the service); and/or including other types of transportation services such as light rail, bus, airlines, etc, on either a one-off basis or as a subscription style "pass". In one embodiment, payments made by business destinations (and/or other discounts or surcharges) may be passed on, in whole or in part, to the subscriber.

In one embodiment, a subscriber to the system may be permitted to have up to a certain number of guest passengers during the subscription period, either under a flat (e.g., monthly) fee or for a small surcharge. Certain restrictions may be placed on this feature. For example, guests may be required to be dropped off before (or at the same time as) the subscriber.

In addition, in one embodiment, a single membership may be shared among several different passengers. Once again, limits may be set on this type of passenger usage including, for example, service usage of only one member at any given time (e.g., similar to what certain ISPs do to limit abuse by multiple user IDs under a single membership). Users under group memberships may be permitted to share a predetermined number of miles or time under a billing plan (e.g., similar to group packages for cellular phones). In this embodiment, users may be required to be part of the same physical household.

In one embodiment, a passenger may use a car that he/she owns to pay for the service. For example, the passenger would transfer title of a car worth $10,000 to the an organization connected to the billing system. The organization would credit the passenger with some amount of service. The organization may sell the car and may, as an inducement, offer credits for more than the value of the car. The organization may also issue credits for purchasing goods and services via the personal information display or other credits, including a refund directly to the former car owner.

One embodiment allows for a "hub and spoke" system of transportation, which would increase pickup and delivery densities and reduce costs. In this embodiment, a subscriber receives an estimated drop off time that may include a stop at a hub. Like an airline reservation, the subscriber will be advised by the data center of which connection he/she must catch and the departure time for that connection. Unlike previous systems, however, in this embodiment, a central system tracks the estimated arrival times for each subscriber that has a connection and verifies that a seat is available (and optionally reserves a specific seat) and may also request that a departing connection not leave until the incoming passengers arrive.

Optionally, the connections may be via transportation vehicles other than an automobile such as, for example, the subway, inter-city rail, light rail, airlines, bus, or ship/ferry, to name a few. In this embodiment, different transportation links may be selected for the user based on the price the user is willing to pay for the transportation services. Moreover, the user may be presented with a group of transportation link options from which to select when planning a trip (e.g., bus from point A to point B, then automobile from point B to point C).

One embodiment of the invention may be used for coordinating a single shared resource that is cooperatively owned. For example, existing services allow an individual to purchase a portion of an airplane or jet and share its use among other owners. Unlike prior systems, however, this embodiment of the invention would provide centralized tracking and coordination among the members sharing the resource (e.g., at the data center). For example, a resource calendar may be maintained at the data center, setting forth days when each member is to be allocated the resource. In addition, the location of the resource could be continually tracked at the data center so that other members know exactly where it is at any given time. One embodiment of the invention may be used to coordinate a pool of shared mobile resources such as fractional jets or car sharing.

One embodiment of the invention would allocate a pool of transportation resources (rather than a single resource) between a plurality of passengers. This embodiment may be implemented under a variety of resource sharing business models, including those discussed above. For example, passengers may pay a periodic subscription fee for the right to use the transportation resources on a regular basis. Certain limitations may be placed on users in this embodiment. For example, the periodic payment may be for the right to use transportation resources for a limited number of miles or hours, after which the passenger may be required to pay a surcharge. In addition, the type of resource used may factor in to this calculation. For example, each mile/hour used in a luxury automobile may be equivalent to 1 mile/hour in a compact car. Various other business models may be implemented consistent with the underlying principles of the invention.

In one embodiment, the user may request a vehicle to perform a delivery in lieu of arranging for the delivery by a delivery service. In addition, the service may also be used to deliver a particular transportation resource (e.g., a rental car, a cooperatively owned automobile, etc) to the passenger. The foregoing embodiment may be useful for long-distance trips, further mimicking the full value proposition of car ownership. Embodiments of the present invention include various steps, which have been described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

One embodiment of the invention employs a peer-to-peer system for linking drivers to passengers (rather than a system with a centralized data center). In this embodiment, the user's request may be routed through the wireless network 120 directly to one or more drivers within the passenger's geographical area. The location of the passenger in this embodiment may be determined using any of the location techniques described above. For example, the location of the driver may be identified based on the cellular cell within which the request was received. Any potential drivers within that cell may then be automatically transmitted the user's cell number so that the driver may call the passenger to coordinate transportation directly. As described above, the request may be sent to the most "appropriate" driver first based on variables discussed above (e.g., price, safety and/or reliability of the driver, class of service, number of passengers, . . . etc). In one embodiment, interactions between passenger and drivers occur between nodes on a network (e.g., an Internet protocol (IP) network) with direct communication between the network nodes.

A further application of embodiments of the invention is to allow for a more precise method of hailing a taxi. Rather than relying exclusively on sight for evidence of waiting fare, a driver could use the invention to identify where passengers are available. There are benefits for passengers in avoiding inclement weather and minimizing opportunities for racial and other visually-based discrimination.

A further application of the invention is to allow a taxi or other mobile resource to find the location of the passenger when the passenger changes location over time. For example, a passenger may be walking down a street while waiting for the driver. Periodic updates on the location of the passenger allows the driver to find the passenger.

In one embodiment, location and travel time information from a vehicle is periodically and/or continually transmitted and tracked by the data center. This real-time travel data can be used by the data center in a variety of ways. For example, in one embodiment, this data is used to determine an optimal route from the pickup point to the destination and/or from the driver notification point (i.e., the point from which the driver accepts the pickup) to the pickup point. In this embodiment, the amount of time taken to travel certain segments of the trip may be evaluated by compiling and analyzing drive times for all other vehicles over these segments. The results of this analysis may then be used by the system to determine the most efficient route for the driver to take to the pickup point and/or to the passenger's destination. Thus, if another driver recently encountered construction or other backups on a particular street, this information will be used to reroute other drivers to minimize delays. In one embodiment, the driver may be presented with several alternate paths, each with an estimated drive time, from which the driver may select. In one embodiment, these paths may be displayed graphically using a mapping technology which graphically illustrates the various paths on a map.

One embodiment of a system and method by which the foregoing analysis and routing can be accomplished is as follows: A map is divided into travel segments. These segments can be as small or as large as appropriate, depending on the circumstances. For example, a single city block might be a travel segment in the city and a 2 miles section between two exits might be a travel segment for a highway. As vehicles travel through a segment, the time of their entry and exit is monitored. In one embodiment, the location identification device (e.g. GPS) calculates the location and transmits it to a data center whenever it enters or exits a travel segment. In one embodiment, location information is regularly transmitted on a periodic basis. In this embodiment, a calculation is made between two measurements to calculate the speed of travel and distance traveled. Regardless of which embodiment chosen for communicating location and time information, the data is stored in a database or other data structure.

Various analysis can be performed to determine whether a travel segment is slower than expected. For example, a simple average over time can be calculated to establish a typical speed and variations from that average indicate slowdowns. Another example is to have average speeds for different times of day to account for times such as rush hour congestion. Another example is to determine variations from comparable speeds of neighboring paths (e.g. city blocks). Another example is to compare the speed with posted speed limits. In addition, there are other optimization and anomaly detection algorithms known in the art that may be employed in the routing analysis. Information on current traffic conditions can be used to develop more efficient routing using these routing algorithms.

In one embodiment, the speed of travel is also transmitted to a data center and that data is used to calculate the speed of travel for a particular segment. Similarly, in one embodiment, data related to traffic congestion can be input manually or automatically to allow information from police, emergency teams, and other sources of traffic information to be factored into the analysis for different travel segments.

Elements of the invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer-implemented method for determining an efficient transportation route comprising:
   compiling travel data over one or more travel segments, said travel data transmitted from one or more transportation vehicles traveling over said travel segments;
   receiving positional data associated with a transportation request, said positional data including an origin and a destination; and
   providing a driver of a vehicle with a first efficient route from said origin to said destination using said travel data, said first efficient route including one or more of said travel segments,
   wherein said destination is a pickup point of a passenger submitting a transportation request and said origin is a current position of said vehicle.

2. The method as in claim 1 wherein said transportation request is transmitted over a wireless network from said passenger's wireless device.

3. The method as in claim 3 wherein said destination is determined by positional data generated by positional tracking logic in said passenger's wireless device.

4. The method as in claim 3 wherein said positional tracking logic is global positioning system ("GPS") logic and wherein said wireless device communicates with one or more GPS satellites.

5. The method as in claim 1 wherein said one or more drivers are selected based on a price which said passenger is willing to pay and a price said one or more drivers are willing to accept.

6. The method as in claim 5 further comprising:
   transmitting a pickup confirmation to said passenger responsive to receiving a response from a first driver indicating that said first driver can service said request.

7. The method as in claim 1 wherein said travel data includes an amount of time expended by a vehicle in traveling across a portion of said travel segment.

8. The method as in claim 1 wherein said travel data includes a speed of a vehicle in traveling across a portion of said travel segment.

9. The method as in claim 1 wherein said travel data is transmitted from a wireless device configured in a vehicle.

10. The method as in claim 1 further comprising:
    providing a driver of a vehicle with a second efficient route from said origin to said destination using said travel data, said second efficient route including one or more of said travel segments.

11. The method as in claim 10 wherein said first and/or said second route are graphically displayed on a map.

12. A system for determining an efficient transportation route comprising:
    communication means for receiving travel segment data from one or more transportation vehicles;
    route determination means for analyzing said travel segment data and calculating a first efficient route from an origin to a destination based on said travel segment data; and
    transportation request means for receiving passenger transportation requests over a wireless network from a passenger's wireless device, said transportation requests including said destination.

13. The system as in claim 12 wherein said communication means further comprises:
    wireless communication means for receiving said travel segment data over a wireless network from said one or more transportation vehicles.

14. The system as in claim 12 further comprising destination identification means for locating said destination.

15. The system as in claim 14 wherein said destination identification means includes GPS logic for locating said destination.

16. The system as in claim 12 further comprising origin identification means for locating said origin.

17. The system as in claim 16 wherein said origin identification means includes GPS logic for locating said origin.

18. A computer-implemented method for providing transportation services comprising:
    receiving a transportation request from a passenger;
    tracking said passenger's position following said request using positional detection logic; and
    transmitting positional data identifying said passenger's position to a pickup vehicle.

19. The method as in claim 18 wherein said transportation request is received over a wireless network from said passenger's wireless device.

20. The method as in claim 19 wherein said positional detection logic is embedded in said passenger's wireless device.

21. The method as in claim 20 wherein said positional detection logic is global positioning system ("GPS") logic.

22. The method as in claim 20 further comprising:
    re-transmitting positional data identifying said passenger's position to said pickup vehicle at periodic intervals.

23. The method as in claim 20 further comprising:
    re-transmitting positional data identifying said passenger's position to said pickup vehicle at periodic intervals.

24. The method as in claim 20 further comprising:
    re-transmitting positional data identifying said passenger's position to said pickup vehicle responsive to movement of said passenger.

25. A computer-implemented method for determining an efficient transportation route comprising:

compiling travel data over one or more travel segments, said travel data transmitted from one or more transportation vehicles traveling over said travel segments;

receiving positional data associated with a transportation request, said positional data including an origin and a destination; and providing a driver of a vehicle with a first efficient route from said origin to said destination using said travel data, said first efficient route including one or more of said travel segments, wherein said one or more drivers are selected based on a price which said passenger is willing to pay and a price said one or more drivers are willing to accept.

26. A computer-implemented method for determining an efficient transportation route comprising:

compiling travel data over one or more travel segments, said travel data transmitted from one or more transportation vehicles traveling over said travel segments;

receiving positional data associated with a transportation request, said positional data including an origin and a destination; and providing a driver of a vehicle with a first efficient route from said origin to said destination using said travel data, said first efficient route including one or more of said travel segments, wherein said travel data includes an amount of time expended by a vehicle in traveling across a portion of said travel segment.

27. A computer-implemented method for determining an efficient transportation route comprising:

compiling travel data over one or more travel segments, said travel data transmitted from one or more transportation vehicles traveling over said travel segments;

receiving positional data associated with a transportation request, said positional data including an origin and a destination;

providing a driver of a vehicle with a first efficient route from said origin to said destination using said travel data, said first efficient route including one or more of said travel segments; and providing a driver of a vehicle with a second efficient route from said origin to said destination using said travel data, said second efficient route including one or more of said travel segments.

* * * * *

UNITED STATES PATENT AND TRADEMARK OFFICE
CERTIFICATE OF CORRECTION

PATENT NO. : 6,356,838 B1
DATED : March 12, 2002
INVENTOR(S) : Sunil Paul

It is certified that error appears in the above-identified patent and that said Letters Patent is hereby corrected as shown below:

Column 11,
Line 47, delete "claim 3" and insert -- claim 1 --

Signed and Sealed this

Seventh Day of September, 2004

JON W. DUDAS
*Director of the United States Patent and Trademark Office*